(12) United States Patent
Mikhaylik

(10) Patent No.: US 7,189,477 B2
(45) Date of Patent: Mar. 13, 2007

(54) LOW TEMPERATURE ELECTROCHEMICAL CELLS

(75) Inventor: Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 543 days.

(21) Appl. No.: 10/411,999

(22) Filed: Apr. 10, 2003

(65) Prior Publication Data

US 2004/0202936 A1  Oct. 14, 2004

(51) Int. Cl.
  *H01M 4/58* (2006.01)
(52) U.S. Cl. .............. 429/231.95; 429/324; 429/326; 429/336; 429/337
(58) Field of Classification Search ........... 429/231.95, 429/324, 326, 336, 337
  See application file for complete search history.

(56) References Cited

U.S. PATENT DOCUMENTS

| | | | |
|---|---|---|---|
| 4,664,991 A | 5/1987 | Perichaud et al. | |
| 5,194,341 A | 3/1993 | Bagley et al. | |
| 5,529,860 A | 6/1996 | Skotheim et al. | |
| 5,601,947 A | 2/1997 | Skotheim et al. | |
| 5,690,702 A | 11/1997 | Skotheim et al. | |
| 5,723,230 A | 3/1998 | Naoi et al. | |
| 5,783,330 A | 7/1998 | Naoi et al. | |
| 5,792,575 A | 8/1998 | Naoi et al. | |
| 5,882,819 A | 3/1999 | Naoi et al. | |
| 5,935,724 A | 8/1999 | Spillman et al. | |
| 5,935,728 A | 8/1999 | Spillman et al. | |
| 5,962,171 A * | 10/1999 | Boguslavsky et al. | 429/325 |
| 6,117,590 A | 9/2000 | Skotheim et al. | |
| 6,153,337 A | 11/2000 | Carlson et al. | |
| 6,190,426 B1 | 2/2001 | Thibault et al. | |
| 6,201,100 B1 | 3/2001 | Gorkovenko et al. | |
| 6,296,967 B1 | 10/2001 | Jacobs et al. | |
| 6,302,928 B1 | 10/2001 | Xu et al. | |
| 6,406,815 B1 | 6/2002 | Sandberg et al. | |
| 6,652,440 B1 | 11/2003 | Kovalev et al. | |
| 2002/0182508 A1 * | 12/2002 | Nimon et al. | 429/231.95 |

OTHER PUBLICATIONS

David Linden, "Handbook of Batteries," Second Edition, McGraw-Hill, Inc., 1994, no month available.
"Handbook of Batteries", Linden, David; 1995, 2nd Edition, Chapter 36, p. 2, McGraw-Hill, New York, no month available.

* cited by examiner

*Primary Examiner*—Bruce F. Bell
(74) *Attorney, Agent, or Firm*—Jacqueline M. Nicol; Squire, Sanders & Dempsey L.L.P.

(57) ABSTRACT

Disclosed is an electrochemical cell comprising a lithium anode and a sulfur-containing cathode and a non-aqueous electrolyte solvent. In the fully charged state of the cell the concentration of lithium ions is preferably less than 0.3 M. The cell delivers high discharge capacity at discharge rates, for example, C/5, over temperatures ranges of from +25° C. to −20° C. Also disclosed is a battery including an electrochemical cell according to the invention and a device that utilizes such a battery to derive power.

32 Claims, 2 Drawing Sheets

LOW TEMPERATURE ELECTROCHEMICAL CELLS

TECHNICAL FIELD

The present invention relates generally to the field of electrochemical cells and batteries, and an electrolyte for use in an electrochemical cell. More particularly, this invention pertains to electrochemical cells in which the cathode comprises an electroactive sulfur-containing material and which can deliver a high percentage of the theoretical discharge capacity at a low temperature and high discharge rates.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

There has been considerable interest in recent years in developing high energy density batteries with lithium containing anodes. Lithium metal is particularly attractive as the anode active material of electrochemical cells because of its light weight and high energy density, compared, for example, to anode active materials, such as lithium intercalated carbon anodes, where the presence of non-electroactive materials increases the weight and volume of the anode, and thereby reduces the energy density of the cells. The use of lithium metal anodes, or those comprising mainly lithium metal, provides an opportunity to construct cells that are lighter in weight and have a higher energy density than cells such as lithium-ion, nickel metal hydride or nickel-cadmium cells. These features are highly desirable for batteries for portable electronic devices such as cellular telephones and laptop computers, as noted, for example, in Linden in *Handbook of Batteries*, 1995, $2^{nd}$ Edition, chapter 14, pp. 75–76, and chapter 36, p.2, McGraw-Hill, New York and in U.S. Pat. No. 6,406,815 to Sandberg et al.

There is also a desire to use battery-operated devices in challenging environments, such as lower-temperature environments as, for example, environments encountered outdoors in winter. At temperatures well below room temperature, such as −10° C. to −20° C., many batteries have a significantly reduced discharge capacity. Reduction in discharge capacity at low temperatures is particularly severe in higher discharge rate applications, such as 0.2 C (C/5) or greater.

There has been considerable interest in recent years in developing high energy density cathode-active materials for use in high energy primary and secondary batteries with alkali-metal anode materials. Several types of cathode materials for the manufacture of thin-film lithium and sodium batteries are known and include cathode materials comprising sulfur-sulfur bonds, wherein high energy capacity and rechargeability are achieved from the electrochemical cleavage (via reduction) and reformation (via oxidation) of these bonds. Sulfur containing cathode materials, having sulfur-sulfur bonds, disclosed for use in lithium and sodium batteries comprise elemental sulfur, organo-sulfur, and carbon-sulfur compositions.

The choice of electrolyte for a particular cathode and anode combination depends on one or more of many factors, including: safety, cycle life, and chemical compatibility of the cathode and anode materials to the components of the electrolyte.

SUMMARY OF THE INVENTION

The present invention provides an electrochemical cell comprising (a) an anode preferably comprising lithium, (b) a cathode comprising an electroactive sulfur-containing material, and (c) a non-aqueous electrolyte. The non-aqueous electrolyte comprises one or more oxygen-containing solvents and one or more lithium salts, wherein the concentration of the lithium salts in the fully charged cell is less than 0.3 M.

The cells of the present invention provide at a discharge rate of from C/5 to 5 C greater than 35% of the theoretical discharge capacity of the electroactive sulfur-containing material in the temperature range of −10° C. to +25° C.

DETAILED DESCRIPTION OF THE INVENTION

Figure 1:
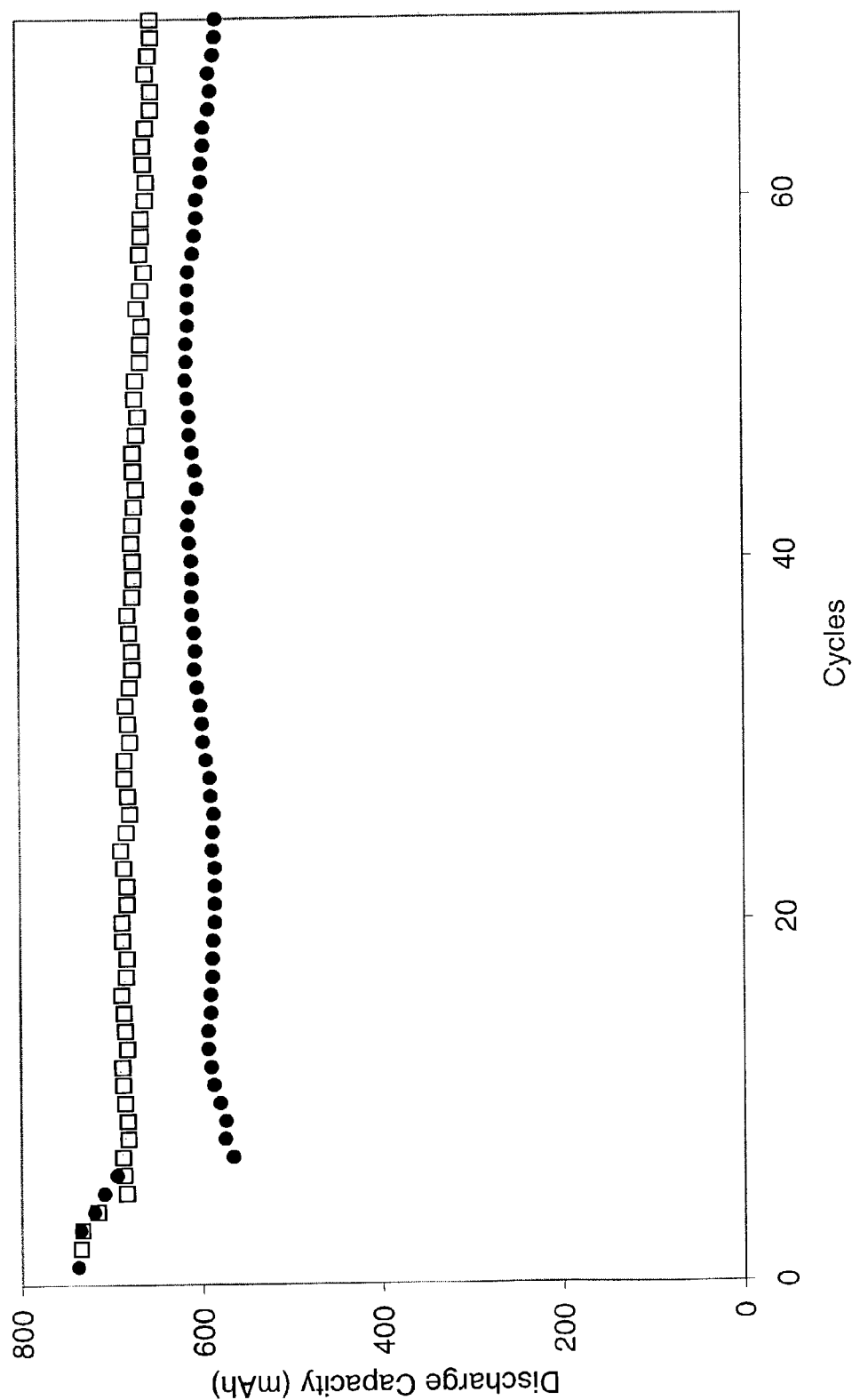
FIG. 1 shows the discharge capacity vs. cycle number for the cells of Example 5; cycles 6–60 at +25° C. (●) and cycles 6–60 at −20° C. (●).

The electrochemical cells of the present invention are preferably rechargeable and are characterized by high discharge capacity at room temperature (about 20 –25° C.) and improved performance at low temperatures (about 0° C. and below), for example, a high discharge capacity at a rate of discharge of at least C/5.

The terms "C/10", "C/5", or "C rate," as used herein, describe the discharge or the charge current of a cell expressed in terms of the rated capacity of the cell. The "C rate" is described, for example, by Linden in *Handbook of Batteries*, 1995, $2^{nd}$ Edition, pp. 3.5–3.6, McGraw-Hill, New York.

The term "theoretical discharge capacity" of the electroactive sulfur-containing material, as used herein, describes the capacity from the breaking of sulfur-sulfur bonds. For example, for elemental sulfur the theoretical discharge capacity is 1675 mAh/g. The term "fully charged", as used herein, relates to a condition of the electroactive sulfur-containing cell in which under the charging rate applied the concentration of lithium ions in the electrolyte no longer decreases with continued application of charging current.

In addition to the improvements in low temperature discharge capacity from the electrochemical cells of the present invention, the very low concentration of lithium ions in the fully charged state of the cell provides overcharge protection. Further, the electrochemical cells of the present invention (may in some embodiments) provide over-discharge protection.

One embodiment of the present electrochemical cell according to the invention comprises: (a) an anode; (b) a cathode comprising an electroactive sulfur-containing material; and (c) a non-aqueous electrolyte interposed between the anode and the cathode, the electrolyte comprising: (i) one or more non-aqueous oxygen-containing solvents selected from the group consisting of acyclic ethers, cyclic ethers, polyethers, and sulfones; and (ii) one or more lithium salts. In the fully charged state of the cell, the concentration of the one or more lithium salts is less than 0.3 M. The cell preferably delivers, at a discharge rate of from C/5 to 5 C, greater than 35% of the theoretical discharge capacity of the electroactive sulfur-containing material when the cell is within the temperature range of +25° C. to −10° C., (meaning that the cell has been exposed to an ambient temperature within this range long enough for the cell itself to have a temperature within this range).

Another embodiment of the present electrochemical cell according to the invention comprises: (a) an anode comprising lithium; (b) a cathode comprising an electroactive sulfur-containing material; and (c) a non-aqueous electrolyte interposed between the anode and the cathode, the electrolyte comprising one or more non-aqueous oxygen-containing solvents selected from the group consisting of acyclic ethers, cyclic ethers, polyethers, and sulfones. In the fully charged state of the cell, the concentration of lithium salts is essentially zero. The cell preferably delivers, at a discharge rate of from C/5 to 5 C, greater than 35% of the theoretical discharge capacity of the electroactive sulfur-containing material when the cell is within the temperature range of +25° C. to −20° C.

Nonaqueous Electrolyte

The purpose of the electrolyte is to provide a medium for transfer of electrons, as ions, inside a cell between an anode and a cathode. Any non-aqueous electrolyte capable of performing this function for the cell in which it is used is suitable for this invention. Organic solvents for use in a non-aqueous electrolyte according to the invention include families such as, acetals, ketals, sulfones, acyclic ethers, cyclic ethers, glymes, polyethers, dioxolanes, substituted forms of the foregoing, and blends thereof.

Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane.

Examples of cyclic ethers that may be used include, but are not limited to, tetrahydrofuran, tetrahydropyran, 2-methyltetrahydrofuran, 1,4-dioxane, 1,3-dioxolane, and trioxane.

Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers.

Examples of sulfones that may be used include, but are not limited to, sulfolane, 3-methyl sulfolane, and 3-sulfolene.

The specific choice of solvent for a particular cell will depend on one or more of several factors, including the composition of the anode and cathode and the solubility of the lithium salts of the anions generated during discharge of the electroactive sulfur-containing material of the cathode. Although a single solvent may be used, mixtures of solvents comprising two or more solvents selected from acyclic ethers, glymes and related polyethers, and cyclic ethers, such as 1,3-dioxolane are also suitable. Preferred mixtures of solvents include, but are not limited to, 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the preferred binary mixtures may vary from about 5 to 95 to 95 to 5. Preferred are mixtures comprising dioxolane. Most preferred are mixtures comprising greater than 80% by weight of dioxolane.

Ionic Concentration

In the cells of the preferred embodiment, in the fully charged state, the electrolyte comprises one or more non-aqueous solvents and contains relatively low concentrations of lithium salts. In one embodiment, the concentration of lithium salts in the fully charged state is any concentration less than 0.3 M. In another embodiment, the concentration of lithium salts in the fully charged state is less than 0.15 M. In another embodiment, the concentration of one or more lithium salts is less than 0.05 M. In another embodiment, the concentration of one or more lithium salts is less than 0.01 M. In the preferred embodiment, the concentration of lithium salts in the fully charged state is essentially zero. In the fully charged state of the cells of the present invention, in embodiments where the concentration of lithium salts is greater than essentially zero, the lithium salts may be salts including, but not limited to, one or more of LiBr, LiI, LiSCN, LiCF$_3$SO$_3$, LiN(CF$_3$SO$_2$)$_2$, and LiC(CF$_3$SO$_2$)$_3$. Preferred salts are LiSCN and LiCF$_3$SO$_3$.

While not being bound by any specific theory, it is believed that the inventions superior results are achieved for, among other things, the following reasons. In cells comprising no added lithium salt, conductivity at full charge is very low. Upon discharge at low current, lithium ions, together with polysulfide counterions, are formed resulting in rapidly increasing conductivity with increasing discharge. Alternatively, self-discharge reactions, for example from reaction of cell components such as sulfur from the cathode with lithium of the anode, may provide lithium ions and polysulfide counterions and conductivity. The polysulfides formed upon discharge of the cells of the present invention have high solubility in the electrolyte solvents so that conductivity increases during discharge. However, as the cells approach complete discharge, higher polysulfides are reduced to lower sulfides, such as Li$_2$S, which are much less soluble or even insoluble, so that conductivity decreases again. In cells comprising added lithium salts, conductivity at full charge is high. Upon discharge, lithium ions with polysulfide counterions are formed but conductivity decreases. At low temperatures (about 0° C. and below) this conductivity decrease is especially large so that extremely low discharge capacity is obtained. The data in Table 3 illustrate this behavior for Li$_2$S$_6$, lithium hexasulfide, one typical polysulfide discharge product.

Upon discharge of the cells of the present invention, lithium ions are generated at the anode and sulfur anions are generated at the cathode from the sulfur-containing materials. The lithium ions and sulfur anions may be soluble in the electrolyte and contribute to the ionic conductivity of the electrolyte.

In one embodiment of the present invention, the electroactive sulfur-containing material of the cathode comprises elemental sulfur which upon discharge of the cell generates a mixture of polysulfide anions, S$_n^{2-}$, where n is an integer from 1 to 8. The composition of the mixture of polysulfide anions, S$^{2-}$, may vary considerably depending, for example, on the composition of the one or more electrolyte solvents, the extent of discharge of the cell, and the cell's temperature. The polysulfide anions are soluble in preferred electrolyte solvents of the present invention and contribute to the ionic conductivity of the cells. In other words, when the cells of the present invention are fully charged the concentration of ions in the electrolyte cells is low and upon discharge of the cells, the concentration increases due to the contribution of the cell discharge products, e.g., lithium ions from the anode (if a lithium anode is used) and sulfur anions from sulfur-containing materials of the cathode.

Exemplary conductivity data for solutions of polysulfides in ether electrolyte solvents with and without lithium bis (trifluoromethylsulfonyl) imide (lithium imide) are shown in Table 3 at various temperatures. At 25° C. the ionic conductivity of 1,3-dioxolane (DOL)/dimethoxyethane (DME) solutions of $Li_2S_6$ is only slightly increased in the presence of lithium imide at levels from 10% by weight to 34.5% by weight. At low temperatures, such as −20° C., the ionic conductivity of DOL/DME solutions of $Li_2S_6$ is lower in presence of lithium imide. For example, in a 80/20 mixture by weight of DOL/DME the ionic conductivity at −20° C. of $Li_2S_6$ is reduced 34% from 1.75 mS/cm to 1.15 mS/cm in the presence of 10% by weight of lithium imide. In a 46.5/53.5 mixture, by weight, of DOL/DME the ionic conductivity at −20° C. of $Li_2S_6$ is reduced 95% from 1.93 mS/cm to 0.097 mS/cm in the presence of 34.5% by weight of lithium imide.

Cathode Active Layers

The cathode of a cell according to the invention preferably comprises cathode active layers including an electroactive sulfur-containing material. The preferred cathode active layers are coated onto substrates, such as the current collectors, to form composite cathodes, although any cathode structure that includes electroactive sulfur-containing material may be used. The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials include, but are not limited to, elemental sulfur and organic materials comprising both sulfur atoms and carbon atoms, which may or may not be polymeric. Suitable organic materials include those further comprising heteroatoms, conductive polymer segments, composites, and conductive polymers.

In one embodiment, the electroactive sulfur-containing material comprises elemental sulfur. In another embodiment, the electroactive sulfur-containing material comprises a mixture of elemental sulfur and a sulfur-containing polymer.

In another embodiment, the sulfur-containing material, in its oxidized form, comprises a polysulfide moiety, $S_m$, selected from the group consisting of covalent $-S_m-$ moieties, ionic $-S_m^-$ moieties, and ionic $S_m^{2-}$ moieties, wherein m is an integer equal to or greater than 3, such as, for example, elemental sulfur or sulfur-containing organic polymers. Suitable sulfur-containing organic polymers include, but are not limited to, those described in U.S. Pat. Nos. 5,601,947; 5,690,702; 5,529,860; and 6,117,590 to Skotheim et al.; U.S. Pat. No. 6,201,100 to Gorkovenko et al.; U.S. patent application Ser. No. 09/565,187 to Movchan et al.; and Ser. No. 09/565,184 to Kovalev et al., all of the common assignee, and incorporated herein by reference in their entirety. Other suitable electroactive sulfur-containing materials comprising polysulfide linkages include, but are not limited to, those described in U.S. Pat. No. 4,664,991 to Perichaud et al., and in U.S. Pat. Nos. 5,723,230; 5,783,330; 5,792,575; and 5,882,819 to Naoi et al., the disclosures of which are incorporated herein by reference.

In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing polymer has a polymer backbone chain and the polysulfide moiety, $S_m$, is covalently bonded by one or both of its terminal sulfur atoms on a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

Preferably, the electroactive sulfur-containing material comprises greater than 50% by weight of sulfur. More preferably, the electroactive sulfur-containing material comprises greater than 75% by weight of sulfur, and most preferably, the electroactive sulfur-containing material comprises greater than 90% by weight of sulfur.

The electroactive sulfur-containing cathodes of the present invention may further comprise electroactive metal chalcogenides, electroactive conductive polymers, and combinations thereof.

The cathode active layers may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, and electrically conductive polymers. The amount of conductive filler, if present, is preferably in the range of 2 to 30% by weight.

The cathode active layers may also comprise a binder. The choice of binder material may vary widely. Useful binders are those materials, usually polymeric, that allow for ease of processing of battery electrode composites and are known to those skilled in the art of electrode fabrication. Examples of useful binders include, but are not limited to, polytetrafluoroethylenes (Teflon®), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. Other suitable binders include crosslinked polymers, such as those made from polymers having carboxyl groups and crosslinking agents. The amount of binder, if present, is preferably in the range of 2 to 30% by weight.

Cathode active layers may be prepared by any suitable method. For example, one suitable method comprises: (a) dispersing or suspending in a liquid medium the electroactive sulfur-containing material, as described herein; (b) optionally adding to the mixture of (a) a conductive filler and/or a binder; (c) mixing the composition resulting from (b) to disperse the electroactive sulfur-containing material; (d) casting the composition resulting from (c) onto a suitable substrate; and (e) removing some or all of the liquid from the composition resulting from (d) to provide the cathode active layer.

Examples of suitable liquid media for the preparation of the cathodes include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to the optional current collectors of the present invention by any suitable coating method and then dried using any suitable techniques. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of methods. Examples of suitable methods for the removal of liquid from the mixture include, but are not limited to, hot air convection, heat, infrared radiation, flowing gases, vacuum, reduced pressure, extraction, and by simply air drying.

The method of preparing the cathodes may further comprise heating the electroactive sulfur-containing material to a temperature above its melting point and then resolidifying the melted electroactive sulfur-containing material to form a cathode active layer having redistributed sulfur-containing material of higher volumetric density than before the melting process, for example, as described in U.S. Pat. No. 6,302,928 to Xu et al.

Anodes

The anode may be of any structure suitable for use in a given electrochemical cell and with a given cathode. Suitable anode active materials, comprising lithium, for the anodes of the present invention include, but are not limited to, lithium metal, such as lithium foil and lithium deposited onto a substrate, such as a plastic film, and lithium alloys, such as lithium-aluminum alloys and lithium-tin alloys.

Separators

The electrochemical cells of the present invention may further comprise a separator interposed between the cathode and anode, although a separator is optional. Typically, the separator is a solid non-conductive or insulative material which separates or insulates the anode and the cathode from each other and which permits the transport of ions through the separator between the anode and the cathode.

The pores of the separator may be partially or substantially filled with electrolyte. Separators may be supplied as porous free standing films which are interleaved with the anodes and the cathodes in the fabrication of electric current producing cells. Alternatively, the porous separator layer may be applied directly to the surface of one of the electrodes, for example, as described in U.S. Pat. No. 6,153,337 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehinite layer, which may be provided either as a free standing film or by a direct coating application on one of the electrodes, as described in U.S. Pat. No. 6,153,337, by Carlson et al. Solid polymer electrolytes and gel polymer electrolytes may also function as a separator in addition to their electrolyte function.

Cells and Batteries

Cells of the present invention may be made in a variety of sizes and configurations which are known to those skilled in the art or in any suitable fashion. These battery design configurations include, but are not limited to, planar, prismatic, jelly roll, w-fold, stacked and the like. Although the methods of the present invention are particularly suitable for use with thin film electrodes, they may nevertheless be beneficial in thick film designs. Alternatively, designs incorporating both low and high surface area regions, as described in U.S. Pat. Nos. 5,935,724 and 5,935,728 to Spillman et al., can be incorporated into jellyroll and other configurations.

Thin film electrodes may be configured into prismatic designs. With the drive to conserve weight thin film barrier materials are particularly preferred, e.g., foils. For example, U.S. Pat. No. 6,190,426 to Thibault et al. describes methods for preparing prismatic cells in which suitable barrier materials for sealed casing, methods of filling cells with electrolyte, and methods of sealing the casing, are described. When using thin film electrodes configured into prismatic designs it is important that the electrodes possess dimensional stability.

Batteries may be of any size or shape and may comprise one or more cells according to the invention. For example, one or more of the prismatic cells described in U.S. Pat. No. 6,190,426 to Thibault et al. may be connected to form a battery. Batteries comprising one or more cells may be encased in a rigid casing, for example, as described in U.S. Pat. No. 6,296,967 to Jacobs et al.

Properties of Cells

The cells of the present invention deliver relatively high capacity at both room temperature (about 20–25° C.) and at low temperatures (about 0° C. and below). Cells were allowed sufficient time to reach the desired temperature before charge/discharge cycling and before measurement of discharge capacity. For example, for prismatic cells such as those of Examples 1–5, 8–11, and 13 it was found that at least 30 minutes was required for the cells to reach a low ambient temperature from room temperature and typically a cell was exposed to a given temperature for 60 minutes or more before being tested. In one embodiment, cells of the present invention deliver, at a C/5 discharge rate, greater than 45% of the theoretical discharge capacity of the electroactive sulfur-containing material at 25° C. and greater than 35% of the theoretical discharge capacity of the electroactive sulfur-containing material at −10° C. Example 2 in Table 1, for example, in which the DOL/DME electrolyte contains essentially zero concentration of ions in the fully charged state, delivers 53% of the theoretical capacity of the electroactive sulfur-containing material at 25° C. at a C/2 rate and 42% of the theoretical capacity of the electroactive sulfur-containing material at −10° C. at a C/2 rate. In contrast, Example 1, a comparative example that is outside the scope of the invention, in which the electrolyte is 1.4 M lithium imide in DOL/DME, delivers 58% of the theoretical discharge capacity of the electroactive sulfur-containing material at 25° C. at a C/2 rate and only 6% of the theoretical capacity of the electroactive sulfur-containing material at −10° C.

Cells of the present invention having essentially zero concentration of ions, for example, in a fully charged state or an over-discharged state, have a resistivity of about 1 Ohm-cm.

The cells of the present invention deliver relatively high capacity for many cycles at room temperature (about 20–25° C.) and at low temperature (about 0° C. and below). For example, the cells of Example 5 as shown in Table 1 and FIG. 1 deliver 48–46% of the theoretical discharge capacity of the electroactive sulfur-containing material at 25° C. at a 400 mA discharge current (higher than C/2) for cycles 6–60 and deliver 40–38% of the theoretical discharge capacity of the electroactive sulfur-containing material for cycles 6–60 at −20° C. at a 400 mA discharge current (higher than C/2).

TABLE 1

Discharge Performance

| Example | Temperature | Discharge Capacity (Cycle Number) | Discharge Current | % of Theoretical Capacity in S-material |
|---|---|---|---|---|
| Example 1 | +25 ° C. | 870 mAh (Cycle 5) | 350 mA | 58% |
| Example 1 | −10 ° C. | 60 mAh (Cycle 6) | 350 mA | 4% |
| Example 2 | +25 ° C. | 800 mAh (Cycle 5) | 350 mA | 53% |
| Example 2 | −10 ° C. | 630 mAh (Cycle 6) | 350 mA | 42% |
| Example 3 | +25 ° C. | 770 mAh (Cycle 5) | 350 mA | 51% |
| Example 3 | −10 ° C. | 575 mAh (Cycle 6) | 350 mA | 38% |
| Example 4 | +25 ° C. | 660 mAh (Cycle 60) | 150 mA | 44% |
| Example 4 | −20 ° C. | 550–520 mAh (Cycle 61–80) | 150 mA | 36–34% |
| Example 5 | +25 ° C. | 720–690 mAh (Cycle 6–60) | 400 mA | 48–46% |
| Example 5 | −20 ° C. | 605–580 mAh (Cycle 6–60) | 400 mA | 40–38% |

The cells of the present invention show excellent cycle life as shown, for example, in Table 2. Cells of Example 8, in which the electrolyte contains essentially zero ions in the fully charged state, deliver 127 cycles to a discharge capacity cutoff of 600 mAh and 170 cycles to a discharge capacity cutoff of 500 mAh. In contrast, cells of Example 10, a comparative example, in which the electrolyte is 1.4 M lithium triflate, deliver only 50 cycles to a 600 mAh discharge capacity cutoff and 60 cycles to a 500 mAh discharge capacity cutoff.

TABLE 2

Cycle Life and Capacity Performance of Cells in Dioxolane/Dimethoxyethane (90/10)

| Example | Li Triflate Concentration | $Q_5$ (mAh) | $Q_6$ (mAh) at −10° C. | $Q_6/Q_5$ | Cycles to 600 mAh | Cycles to 500 mAh |
|---|---|---|---|---|---|---|
| Example 8 | 0 | 810 | 672 | 83% | 127 | 170 |
| Example 9 | 0.5 M | 930 | 698 | 75% | 75 | 83 |
| Example 10 | 1.4 M | 960 | 652 | 68% | 50 | 60 |
| Example 11 | 2.2 M | 920 | 129 | 14% | 75 | 84 |

Figure 2:
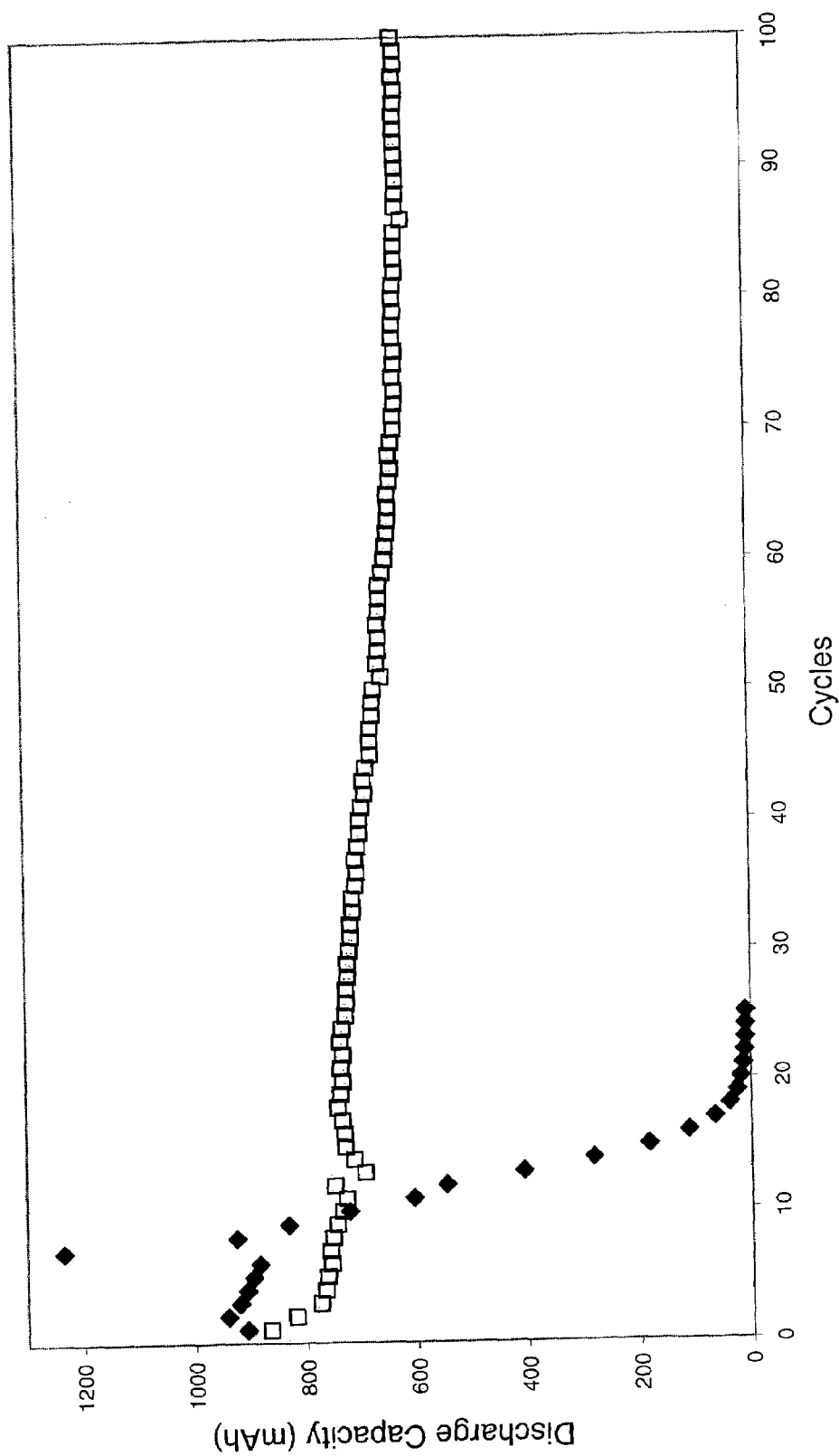
FIG. 2 shows the discharge capacity vs. cycle number for the cells of Example 6 (♦) and the cells of Example 7 (□).

An additional benefit that may be provided by the present invention is the protection of the cell against over-discharge. For example, as illustrated in Example 7, cells with essentially zero ions in a fully charged state can be discharged more than 85 cycles to 0.0 V rather than the normal 1.5 V, which is an over-discharge, and deliver at each discharge cycle from 40% to 60% of the theoretical capacity of the electroactive sulfur-containing material. The cells of Example 6, a comparative example outside the scope of the invention, in which the electrolyte is 1.4 M lithium imide in DME/DOL, under the same over-discharge conditions as Example 7 show a rapid capacity fade to 3% of the theoretical capacity of the electroactive sulfur-containing material after only 10 cycles. FIG. 2 shows the discharge capacity vs. cycle number for the cells of Examples 6 and 7.

While not being bound by any specific theory, it is believed that upon over-discharge of cells of the present invention in which the concentration of one or more lithium salts in the electrolyte, in the fully charged state of the cells, is essentially zero also have essentially zero concentration of ions soluble in the electrolyte after over-discharge. In other words, as over-discharge proceeds, the cell conductivity approaches zero and this lack of conductivity protects the cells from damage in the over-discharge. Cells in which the electrolyte in the fully charged state of the cells has a concentration of lithium ions well above zero, such as higher than 0.1M, will maintain conductivity during over-discharge and therefore may suffer damage.

EXAMPLES

Several embodiments of the present invention are described in the following examples, which are offered by way of illustration and not by way of limitation.

Example 1

A cathode was prepared by coating a mixture of 65 parts by weight of elemental sulfur (available from Aldrich Chemical Company, Milwaukee, Wis.), 15 parts by weight of Printex XE-2 (a trade name for conductive carbon available from Degussa Corporation, Akron, Ohio), 15 parts by weight of graphite (available from Fluka/Sigma-Aldrich, Milwaukee, Wis.), 4 parts by weight of TA22-8 resin (a trade name for an acrylate-acrylic acid copolymer available from Dock Resins Corporation, Linden, N.J.), and 1 part by weight of Ionac PFAZ-322 (a trade name for a polyfunctional aziridine crosslinking agent available from Sybron Chemicals Inc., Birmingham, N.J.), dispersed in a solvent mixture of 80% isopropanol, 12% water, 5% 1-methoxy-2-propanol and 3% dimethylethanolamine (on a weight basis), onto a 12 micron thick conductive carbon coated aluminum/polyester (PET) film substrate. After drying, the coated cathode active layer thickness was about 25–27 microns. The anode was lithium foil of about 50 microns in thickness. The electrolyte was a 1.4 M solution of lithium bis (trifluoromethylsulfonyl) imide, (lithium imide available from 3M Corporation, St. Paul, Minn.) in a 42:58 volume ratio mixture of 1,3-dioxolane and dimethoxyethane. The porous separator used was 16 micron E25 SETELA (a trademark for a polyolefin separator available from Tonen Chemical Corporation, Tokyo, Japan, and also available from Mobil Chemical Company, Films Division, Pittsford, N.Y.).

The above components were assembled in a layered structure of cathode/separator/anode, which was wound and compressed, with the liquid electrolyte (approximately 4 g) filling the void areas of the separator and cathode to form prismatic cells with an electrode area of about 840 cm². The sulfur content of the cell was 0.9 g, equivalent to 1506 mAh capacity (1675 mAh/g×0.9 g). After sealing the cells in a foil pouch, they were stored for 24 hours and then re-sealed and discharge-charge cycling on these cells was performed at 350 mA/200 mA, respectively, with discharge cutoff at a voltage of 1.5 V and charge cutoff at 110% of the capacity of the last half cycle. The discharge capacity at the $5^{th}$ cycle was 870 mAh. At the $6^{th}$ cycle the discharge capacity was measured at −10° C. and found to be 60 mAh, 7% of the $5^{th}$ cycle capacity. Cycling was resumed at 25° C. and the $80^{th}$ cycle discharge capacity was 680 mAh.

Example 2

Cells were made by the method of Example 1 except that in place of the imide salt electrolyte an 80:20 mixture by weight of dioxolane and dimethoxyethane without added salt was used. The cells on the first discharge cycle were discharged at 10 mA for 5 hours and then at 350 mA to discharge cutoff of 1.5 V. Subsequent discharge and charge of the cells (350 mA/200 mA, respectively) was performed as described in Example 1. The discharge capacity at the $5^{th}$ cycle was 800 mAh. At the $6^{th}$ cycle the discharge capacity was measured at −10° C. and found to be 630 mAb, 79% of the $5^{th}$ cycle capacity. Cycling was resumed at 25° C. and the $80^{th}$ cycle discharge capacity was 665 mAh.

Example 3

Cells were made by the method of Example 1 except that in place of the imide salt electrolyte dioxolane without added salt was used. The cells were discharged and charged as in Example 2. The discharge capacity at the $5^{th}$ cycle was 770 mAh. At the $6^{th}$ cycle the discharge capacity was measured at −10° C. and found to be 575 mAh, 75% of the $5^{th}$ cycle capacity. Cycling was resumed at 25° C. and the $80$th cycle discharge capacity was 640 mAh.

Example 4

A pair of cells were made by the method of Example 1 except that in place of the imide salt electrolyte a 95:5 mixture by weight of dioxolane and dimethoxyethane without added salt was used. The cells were discharged and charged as described in Example 2 except that the discharge-charge current was 150 mA. Sixty discharge-charge cycles were completed at 25° C. and the discharge capacity at the $60^{th}$ cycle was 660 mAh. For cycles 61 to 80 one cell was cycled at −20° C. and the second cell at +25° C. The discharge capacity for the +25° C. cell was between 660 and 650 mAh and the discharge capacity for the cell at −20° C. was between 520 and 550 mAh. The discharge capacity of the low temperature cell was 80–85% of the discharge capacity of the 25° C. cell.

Example 5

A pair of cells were made by the method Example 1 except that in place of the imide salt electrolyte an 80:20 mixture by weight of dioxolane and dimethoxyethane without added salt was used. The cells were discharged and charged as described in Example 2 except that the discharge-charge currents were 400 mA/150 mA, respectively. Five discharge-charge cycles were completed at 25° C. and the discharge capacity at the $5^{th}$ cycle was 730 mAh. For cycles 6 to 60 one cell was cycled at −20° C. and the second cell at +25° C. The discharge capacity for the +25° C. cell was between 720 and 690 mAh and the discharge capacity for the cell at −20° C. was between 580 and 605 mAh as shown in FIG. 1. The discharge capacity of the low temperature cell was 80–87% of the discharge capacity of the 25° C. cell.

Example 6

Cells were made by the method of Example 1. The cells were discharged and charged as described in Example 2 except that the discharge-charge currents were 400 mA/150 mA, respectively. After six discharge-charge cycles, the discharge cutoff voltage was changed to 0.0 V, in place of 1.5 V, which is an over-discharge condition. The discharge capacity decreased with additional cycling reaching less than 50 mAh after 16 cycles. The cells swelled to more than twice their thickness by 20 cycles which means that degradation of cell components to form gaseous materials had taken place. FIG. 2 shows the discharge capacity versus the number of cycles for these cells.

Example 7

Cells were made by the method of Example 1 except that in place of the imide salt electrolyte dioxolane without added salt was used. The cells were discharged and charged as described in Example 6; however, the discharge cutoff voltage was 1.5 V for cycles 1 –6 and 0.0 V for subsequent cycles, an over-discharge condition. Discharge capacity from 760 mAh to 620 mAh was measured for cycles 7 to 95 as shown in FIG. 2. These cells showed no undesirable swelling during these charge and discharge cycles, thus indicating that over-discharge did not cause degradation of cell components.

Example 8

Cells were made by the method of Example 1 except that in place of the imide salt electrolyte a 90:10 mixture by weight of dioxolane and dimethoxyethane without added salt was used. The cells were discharged and charged as described in Example 2. The discharge capacity at the $5^{th}$ cycle was 810 mAh. At the $6^{th}$ cycle the discharge capacity was measured at −10° C. and found to be 672 mAh, 83% of the $5^{th}$ cycle capacity. Cycling was resumed at 25° C. and 127 cycles were obtained before the discharge capacity faded to 600 mAh and 170 cycles were obtained before the discharge capacity faded to 500 mAh.

Example 9

Cells were made by the method of Example 1 except that in place of the imide salt electrolyte a 0.5 M solution of lithium trifluoromethylsulfonate (lithium triflate available from 3M Corporation, St. Paul, Minn.) in a 90:10 mixture by weight of dioxolane and dimethoxyethane was used. The cells were discharged and charged as described in Example 1. The discharge capacity at the $5^{th}$ cycle was 930 mAh. At the $6^{th}$ cycle the discharge capacity was measured at −10° C. and found to be 698 mAh, 75% of the $5^{th}$ cycle capacity. Cycling was resumed at 25° C. and 75 cycles were obtained before the discharge capacity faded to 600 mAh and 83 cycles were obtained before the discharge capacity faded to 500 mAh.

Example 10

Cells were made by the method of Example 1 except that in place of the imide salt electrolyte a 1.4 M solution of lithium triflate in a 90:10 mixture by weight of dioxolane and dimethoxyethane was used. The cells were discharged and charged as described in Example 1. The discharge capacity at the $5^{th}$ cycle was 960 mAh. At the $6^{th}$ cycle the discharge capacity was measured at −10° C. and found to be 652 mAh, 68% of the $5^{th}$ cycle capacity. Cycling was resumed at 25° C. and 50 cycles were obtained before the discharge capacity faded to 600 mAh and 60 cycles were obtained before the discharge capacity faded to 500 mAh.

Example 11

Cells were made by the method of Example 1 except that in place of the imide salt electrolyte a 2.2 M solution of lithium triflate in a 90:10 mixture by weight of dioxolane and dimethoxyethane was used. The cells were discharged and charged as described in Example 1. The discharge capacity at the $5^{th}$ cycle was 920 mAh. At the $6^{th}$ cycle the discharge capacity was measured at −10° C. and found to be 129 mAh, 14% of the $5^{th}$ cycle capacity. Cycling was resumed at 25° C. and 75 cycles were obtained before the discharge capacity faded to 600 mAh and 84 cycles were obtained before the discharge capacity faded to 500 mAh.

Table 2 summarizes the capacity and cycle life performance of the cells described in Examples 8–11. These cells show a decrease in cycle life, for example to a cut off capacity of 500 mAh, with an increase in lithium triflate concentration and a decrease in discharge capacity at the sixth discharge cycle ($Q_6$) at −10° C. with increasing lithium triflate concentration. Thus the cells of the present invention, that is with less than 0.3 M lithium salts in the fully charged state, have much better cycle life and low temperature retention of capacity.

Example 12

Conductivity of $Li_2S_6$ saturated solutions in 1,3-dioxolane/dimethoxyethane (DOL/DME) mixtures with and without lithium imide was determined in YSI Model 3403 conductivity cells and measured at 10 kHz in a Gen Rad 1659 RLC Digibridge apparatus. The results of the measurements at several temperatures are shown in Table 3.

TABLE 3

Conductivity of $Li_2S_6$ Saturated Electrolytes

| Electrolyte Solvent DOL/DME wt ratio | Li Imide Concentration | Conductivity (mS/cm) | | | |
|---|---|---|---|---|---|
| | | 25° C. | 0° C. | −10° C. | −20° C. |
| 80/20 | 10% by wt (0.36 M) | 3.8 | 2.4 | 1.67 | 1.15 |
| 80/20 | 0 | 3.19 | 2.3 | 1.9 | 1.75 |
| 46.5/53.5 | 34.5% by wt. (1.4 M) | 5.2 | 2.3 | 1.5 | 0.097 |
| 46.5/53/5 | 0 | 4.97 | 3.11 | 2.33 | 1.93 |

For saturated solutions of $Li_2S_6$ in DOL/DME solvent systems the presence of lithium imide increases conductivity at 25° C. but at low temperatures such as −10° C. and −20° C. conductivity is reduced by the presence of lithium imide and the reduction of conductivity is greatest for highest lithium imide concentration.

Example 13

Cells were made by the method Example 1 except that in place of the imide salt electrolyte a 80:20 mixture by weight of dioxolane and dimethoxyethane without added salt was used and in place of the 16 micron polyolefin separator a 9 micron polyolefin separator was used. The cells were discharged and charged as described in Example 1 for 5 discharge-charge cycles. The rated capacity of the cells is approximately 700 mAh.

After 5 discharge-charge cycles the cells were divided into 4 sets. One set was discharged and charged at room temperature (RT, 25° C.), one set at −20° C., one set at −30° C., and one set at −40° C. In each set each successive discharge was at a higher current than the current at the previous discharge cycle, with the $6^{th}$ cycle discharge current 75 mA, the $7^{th}$ cycle discharge current 150 mA, up to the $19^{th}$ cycle discharge current of 4200 mA as shown in Table 4.

The theoretical capacity of the cells is calculated to be 1506 mAh (1675 mAh/g×0.9 g) based on the sulfur content of 0.9 g/cell. From the data in Table 4 it can be seen that at a discharge rate of 0.2 C (C/5) the cells deliver at room temperature (approximately 25° C.) 836 mAh or 55.5% of theoretical capacity (836/1506×100%). At −20° C. at the 0.2 C discharge rate the cells deliver 45.6% of the theoretical capacity (687/1506×100%). At −30° C. at the 0.2 C discharge rate the cells deliver 43.6% of the theoretical capacity (657/1506×100%), and at −40° C. at the 0.2C discharge rate the cells deliver 35.9% of the theoretical capacity (541/1506×100%).

TABLE 4

Discharge Capacity (mAh) vs. Temperature

| Discharge Current, mA | Cell Temperature | | | |
|---|---|---|---|---|
| | RT | −20° C. | −30° C. | −40° C. |
| 75 | 748 | 688 | 667 | 596 |
| 150 | 836 | 687 | 657 | 541 |
| 350 | 721 | 468 | 394 | 371 |
| 700 | 636 | 528 | 485 | 426 |
| 1050 | 631 | 550 | 520 | 479 |
| 1400 | 649 | 552 | 530 | 499 |
| 1750 | 651 | 549 | 534 | 504 |
| 2100 | 651 | 550 | 547 | 501 |
| 2450 | 654 | 565 | 562 | 495 |
| 2800 | 646 | 582 | 568 | 484 |
| 3150 | 642 | 587 | 568 | 474 |
| 3500 | 637 | 585 | 565 | 465 |
| 3850 | 632 | 580 | 562 | 456 |
| 4200 | 621 | 574 | 559 | 449 |

While the invention has been described with reference to specific embodiments thereof, it will be apparent to one skilled in the art that various changes and modifications can be made without departing from the spirit and scope thereof. The invention is thus not limited to the specific embodiments but is instead set forth in the appended claims and legal equivalents thereof.

The invention claimed is:
1. An electrochemical cell comprising;
   (a) an anode comprising lithium;
   (b) a cathode comprising an electroactive sulfur-containing material; and
   (c) a non-aqueous electrolyte interposed between the anode and the cathode, the electrolyte comprising:

(i) one or more nonaqueous oxygen-containing solvents selected from the group consisting of acyclic ethers, cyclic ethers, polyethers, and sulfones; and (ii) one or more lithium salts, wherein at least one of the one or more lithium salts is selected from the group consisting of LiBr, LiI, LiSCN, LiCF$_3$SO$_3$, LiN(CF$_3$SO$_2$)$_2$, and LiC(CF$_3$SO$_2$)$_3$ ;

wherein, in the fully charged state of the cell, the concentration of the one or more lithium sats is less than 0.3 M and wherein the cell delivers at a discharge rate of from C/5 to 5 C, greater than 35% of the theoretical discharge capacity of the electroactive sulfur-containing material at temperatures between +25 ° C. to −20 ° C.

2. The cell of claim 1, wherein the concentration of the one or more lithium salts is less than 0.15 M.

3. The cell of claim 1, wherein the concentration of the one or more lithium salts is less than 0.05 M.

4. The cell of claim 1, wherein the concentration of the one or more lithium salts is less than 0.01 M.

5. The cell of claim 4, wherein the cell delivers 40% of the theoretical discharge capacity of the electroactive sulfur-containing material for more than 40 charge-discharge cycles at a C/5 rate when the cell is discharged to 0.0 V.

6. The cell of claim 4, wherein the cell delivers 40% of the theoretical discharge capacity of the electroactive sulfur-containing material for more than 40 charge-discharge cycles at a C/5 rate when the cell is discharged to 0.0 V.

7. The cell of claim 1, wherein the acyclic ether is selected from one or more of the group consisting of diethyl ether, dipropyl ether, dibutyl ether, methyl t-butyl ether, dimethoxymethane, trimethoxymethane, dimethoxyethane, diethoxxyethane, and 1,3-dimethoxyproane.

8. The cell of claim 1, wherein the cyclic ether is selected from one or more of the group consisting of tetrahydrofuran, 2-methyl tetrahydrofuran, tetrahydropyran, 1,3-dioxane, 1,3-dioxane, and 1,4-dioxane.

9. The cell of claim 1, wherein the polyether is selected from one or more of the group consisting of diethylene glycol dimethyl ether, triethylene glycol dimethyl ether, tetraethylene glycol dimethyl ether, and dipropylene glycol dimethyl ether.

10. The cell of claim 1, wherein the sulfone is selected from one or more of the group consisting of sulfolane, 3-methyl sulfolane, and 3-sulfolene.

11. The cell of claim 1, wherein the one or more non-aqueous solvents comprises at east 80% by weight of dioxolane.

12. The cell of claim 1, wherein the one or more lithium salts is selected from the group consisting of LiSCN, LiCF$_3$SO$_3$, and LiN(CF$_3$SO$_2$)$_2.$ 13. The cell of claim 1, wherein the electroactive sulfur-containing material comprises greater than 75% by weight of sulfur.

14. The cell of claim 1, wherein the electroactive sulfur-containing material comprises elemental sulfur.

15. The cell of claim 1, wherein the anode comprises lithium metal.

16. The cell of claim 1 that further includes a separator disposed between the anode and the cathode.

17. A battery comprising a casing and one or more cells of claim 1.

18. A device that utilizes a battery to derive power, the battery comprising a casing and one or more cells of claim 1.

19. The device of claim 18 that is a cellular telephone.

20. The cell of claim 1, wherein the cell after four discharge-charge cycles delivers at a C/5 rate greater 40% of the theoretical discharge capacity of the electroactive sulfur-containing material.

21. The cell of claim 1, wherein the electroactive sulfur-containing material comprises elemental sulfur.

22. The cell of claim 1, wherein the anode comprises lithium metal.

23. An electrochemical cell comprising;

(a) an anode comprising lithium;

(b) a cathode comprising an electroactive sulfur-containing material; and (c) a non-aqueous electrolyte interposed between the anode and the cathode, the electrolyte comprising one or more nonaqueous oxygen-containing solvents selected from the group consisting of acyclic ethers, cyclic ethers, polyethers, and sulfones; and wherein, in the fully charged state of the cell, the concentration of lithium salts is essentially zero and wherein the cell delivers at a discharge rate of from C/5 to 5C, greater than 35% of the theoretical discharge capacity of the electroactive sulfur-containing material at temperatures between +25° C. to −20° C.

24. The cell of claim 1, wherein the cell after four discharge-charge cycles delivers at a C/5 rate greater 40% of the theoretical discharge capacity of the electroactive sulfur-containing material.

25. The cell of claim 1, wherein the cell after four discharge-charge cycles delivers at a C/5 rate greater than 35% of the theoretical discharge capacity of the electroactive sulfur-containing material at temperatures between +25° C. to −10° C.

26. The cell of claim 1, wherein the cell delivers at each discharge cycle greater than 40% of the theoretical discharge capacity of the electroactive sulfur-containing material for more than 10 charge-discharge cycles at a C/5 rate at −10° C.

27. The cell of claim 1, wherein the cell delivers at each discharge cycle greater than 40% of the theoretical discharge capacity of the electroactive sulfur-containing material for more than 40 charge-discharge cycles at a C/5 rate at −10° C. dimethoxymethane, trimethoxymethane, dimethoxyethane, diethoxyethane, and 1,3-dimethoxypropane.

28. The cell of claim 23, wherein the acyclic ether is selected from one or more of the group consisting of diethyl ether, dipropyl ether, dibutyl ether, methyl t-butyl ether, dimethoxymethane, trimethoxymethane, dimethoxyethane, diethoxyethane, and 1,3-dimethoxypropane.

29. The cell of claim 5, wherein the cyclic ether is selected from one or more of the group consisting of tetrahydrofuran, 2-methyl tetrahydrofuran, tetrahydropyran, 1,3-dioxolane, 1,3-dioxane, and 1,4-dioxane.

30. The cell of claim 23, wherein the polyether is selected from one or more of the group consisting of diethylene glycol dimethyl ether, triethylene glycol dimethyl ether, tetraethylene glycol dimethyl ether, and dipropylene glycol dimethyl ether.

31. The cell of claim 23, wherein the sulfone is selected from one or more of the group consisting of sulfolane, 3-methyl sulfolane, and 3-sulfolene.

32. The cell of claim 23, wherein the one or more non-aqueous solvents comprises at east 80% by weight of dioxolane.

* * * * *